XR 3,445,256
May R. H. DALTON 3,445,256
INFRARED ABSORPTIVE SEALING GLASS
Original Filed Nov. 2, 1964
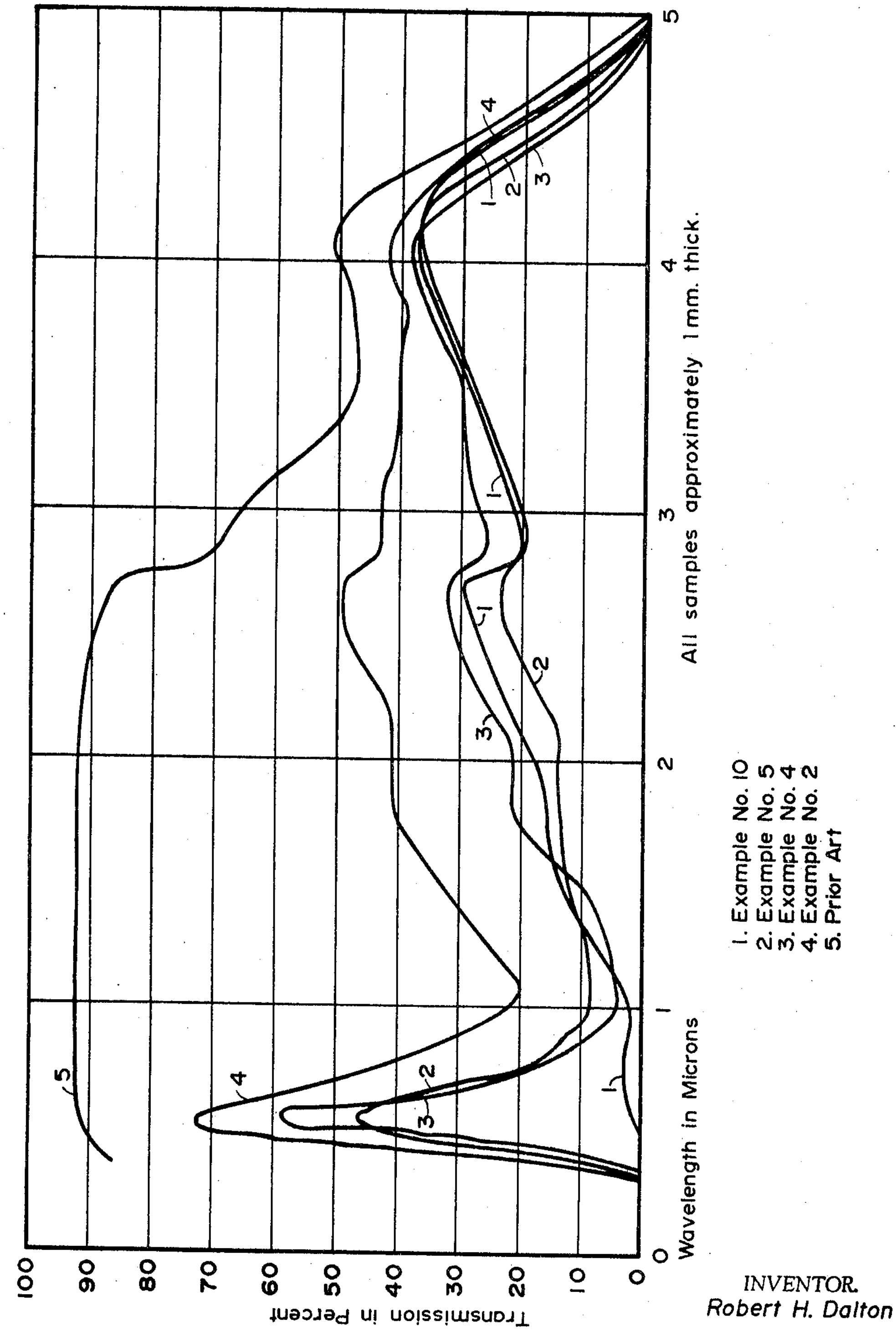
INVENTOR.
Robert H. Dalton
BY Clarence R. Patty, Jr.
ATTORNEY
3445256
OR IN 106/53

United States Patent Office 3,445,256
Patented May 20, 1969

3,445,256
INFRARED ABSORPTIVE SEALING GLASS

Robert H. Dalton, Corning, N.Y., assignor to Corning Glass Works, Corning, N.Y., a corporation of New York Continuation of application Ser. No. 408,118, Nov. 2, 1964. This application Feb. 5, 1968, Ser. No. 703,180
Int. Cl. C03c 3/24, 27/02
U.S. Cl. 106—53 3 Claims

ABSTRACT OF THE DISCLOSURE

This invention relates to infrared absorbing sealing glasses which are suitable for use in encapsulating electronic and lighting devices where radiant energy is utilized as the heat source. These sealing glasses consist essentially of the alkali metal oxides ($R_2O$), lead oxide (PbO), silicon dioxide ($SiO_2$), and a small amount of iron oxide ($Fe_3O_4$), are essentially free of $As_2O_3$, $Sb_2O_3$ and metallic Pb, and have a coefficient of thermal expansion between 0° and 300° C. of about $80–95\times^{-7}/°$ C., and are transparent to visible radiation.

This application is a continuation of application Ser. No. 408,118, filed Nov. 2, 1964, and now abandoned.

The fundamental requirements of a glass-to-metal seal are two. First, the seal must be absolutely impervious, and second, it must have sufficient mechanical and thermal strength for the application intended. To meet these requirements, the seal must be free from any tension stresses which might lead to cracks or checks. Thus, there must be a relatively close expansion match between the glass and the metal.

The glass-to-metal seal is of extreme importance in the fabrication of electrical and electronic devices. Thus, the sealing of metal wires and glass is a basic consideration in the production of lamps, radio tubes, television tubes, and sign light tubing. Likewise, electronic components are manufactured by hermetically sealing crystals of silicon or germanium in glass enclosures, electrical leads passing through these enclosures. In addition, components such as switches, resistors, capacitors, etc., are frequently encapsulated in glass.

In recent years, there has been a considerable subsituation of the conventional type radio tubes by semiconductor solid state devices. This substitution has brought with it a change in sealing techniques. Diodes, transistors, etc., are sensitive to heat and contamination. This factor, coupled with the fact that these devices are generally of small dimensions, has favored the use of radiant heat for sealing rather than a flame. The two sources of such heat most widely used have been a wire coil in air or a focusing lamp. The energy from these sources lies in the infrared portion of the spectrum, generally in the wave length range from around 0.7–4 microns. Hence, there would be a considerable advantage in utilizing a glass which would readily absorb energy of these wave lengths. However, one further physical characteristic which is of particular practical importance in materials useful in the fabrication of enclosures for semiconductor solid state devices is that of transparency such that visual inspection of the device is possible.

The most important sealing metal commercially is known in the art as "Dumet" wire. This material is not homogeneous but consists of a nickel-iron core enclosed in a copper sheath. To form a satisfactory seal with "Dumet" wire, a glass must have a coefficient expansion between 0° and 300° C. of about $80–95\times10^{-7}/°$ C. Two other important sealing alloys, No. 52 Alloy and No. 4 Alloy, require glasses in this same expansion range. No. 52 Alloy is essentially 50% by weight nickel and 50% by weight iron and No. 4 Alloy is essentially 42% by weight nickel, 6% by weight chromium, and 52% by weight iron. One further property which is desirable when the glass is to be employed for encapsulating semicondutor devices is a viscosity of at least 15,000 poises at its liquidus to permit drawing of tubing on automatic machines.

Therefore, the principal object of this invention is to provide a transparent glass having a coefficient of thermal expansion between 0° and 300° C. of $80–95\times10^{-7}/°$ C. and which exhibits good absorbance of infrared radiation generally within the wave length range of 0.7–4 microns.

Another object of this invention is to provide a suitable glass-to-metal seal between a glass exhibiting good absorbance of infrared raditions generally within the wave length range of 0.7–4 microns and having a coefficient of thermal expansion between 0° and 300° C. of about $80–95\times10^{-7}/°$ C. and such metals as "Dumet," No. 52 Alloy, and No. 4 Alloy.

Other objects will become apparent from a study of the following description and the accompanying drawing which sets forth several curves resulting from infrared transmission measurements conducted on various glasses within the scope of the present invention, these curves being contrasted with that of the presently widely-used sealing glass for "Dumet," No. 52 Alloy, and No. 4 Alloy.

I have discovered that the above objects can be attained in a glass within a limited range of the $R_2O\cdot PbO\cdot SiO_2$ field, where $R_2O$ refers to the total of one or more of the alkali metal oxides, which contains a small and specifically restricted amount of iron oxide. Thus, I have found that a glass possessing the suitable coefficient of thermal expansion for sealing to "Dumet," No. 52 Alloy and No. 4 Alloy wire and exhibiting good absorbance of infrared radiations in the wave length range of 0.7–4 microns can be produced from a batch, calculated in weight percent on the oxide basis, of 7–15% $R_2O$, 20–50% PbO, 35–63% $SiO_2$, and 2–6% $Fe_3O_4$, the sum of these constituents totalling at least 95% by weight of the batch.

The quantities of $R_2O$, PbO, and $SiO_2$ must be carefully held within the above-specified limits in order to produce a glass which has the required properties for sealing to "Dumet," No. 52 Alloy and No. 4 Alloy. An excess of alkli also deleteriously affects the chemical durability of the glass. At least about 2% by weight of iron oxide, calculated as $Fe_3O_4$, must be present to provide the desired improvement in infrared absorbance while more than about 6% not only disturbs the mechanical properties of the glass but, more importantly, colors the glass so as to destroy its transparency.

Minor amounts of compatible metal oxides may also be present provided the total of these does not exceed about 5% by weight of the batch. Such compatible metal oxides include CaO, BaO, $B_2O_3$, $Al_2O_3$, MgO, $TiO_2$, and $ZrO_2$. BaO, $Al_2O_3$, MgO, $TiO_2$, and $ZrO_2$ may improve the chemical durability of the glass while $B_2O_3$ can improve the melting qualities of the batch. Very minor amounts of $As_2O_3$ and $Sb_2O_3$ may be included as fining agents but these have an adverse effect on the infrared absorbance and are preferably omitted. To achieve maximum heat absorption it is desirable that as high a percentage of the iron as possible be in the ferrous state. However, too strong a reducing action will lead to production of metallic lead which is highly objectionable. A careful balance between oxidation and reduction must, therefore, be maintained.

In the following examples, the batches were compounded, thoroughly mixed together to insure a homogeneous melt, and then melted under non-oxidizing conditions at temperatures ranging between 1350°–1500° C. for 4–16 hours. The batches were melted in open platinum crucibles and then cane was drawn and/or the melt poured into patties and annealed at 475° C. However, the viscosity of these glass melts at their liquidi was adjusted so that tubing can be drawn from a continuous tank melt.

The following table records examples having compositions included within the above-mentioned ranges calculated from their respective batches to the oxide basis in weight percent, exclusive of minor impurities which may be present in the batch materials. The batch ingredients may comprise any materials, either oxides or other compounds, which, on being fused together are converted to the desired oxide compositions in the proper proportions.

The table also records the softening point, annealing point, strain point, and coefficient of thermal expansion between 0°–300° C. ($\times 10^7$) of each of the examples. These values were obtained utilizing the conventional test methods of the glass art.

| | 1 | 2 | 3 | 4 | 5 |
|---|---|---|---|---|---|
| $SiO_2$ | 38.89 | 60.25 | 59.79 | 38.44 | 38.59 |
| PbO | 48.27 | 20.04 | 20.02 | 48.22 | 45.93 |
| $Na_2O$ | 0.19 | 7.28 | 7.28 | 0.19 | 0.19 |
| $K_2O$ | 5.46 | 7.47 | 7.46 | 5.45 | 5.42 |
| $Rb_2O$ | 2.19 | | | 2.18 | 2.18 |
| $Cs_2O$ | 0.23 | | | 0.23 | 0.23 |
| $Li_2O$ | 0.05 | | 0.50 | 0.55 | 0.05 |
| BaO | 2.03 | | | 2.02 | 2.01 |
| $Al_2O_3$ | | 2.21 | 2.20 | | |
| $Fe_3O_4$ | 2.70 | 2.73 | 2.73 | 2.70 | 5.40 |
| Soft., ° C | 613 | 635 | 612 | 580 | 612 |
| Ann., ° C | 443 | 441 | 423 | 420 | 445 |
| Strain, ° C | 402 | 407 | 387 | 385 | 409 |
| Exp | 83.6 | 92.6 | 95.0 | 85.8 | 81.3 |

| | 6 | 7 | 8 | 9 | 10 |
|---|---|---|---|---|---|
| $SiO_2$ | 53.0 | 52.0 | 54.0 | 54.0 | 54.0 |
| PbO | 30.0 | 30.0 | 30.0 | 31.0 | 30.0 |
| $Na_2O$ | 3.0 | 3.0 | 4.5 | 3.0 | 3.0 |
| $K_2O$ | 9.0 | 9.0 | 8.0 | 9.0 | 9.0 |
| $Al_2O_3$ | 1.0 | 1.0 | 1.0 | 1.0 | 1.0 |
| $Fe_3O_4$ | 4.0 | 5.0 | 2.5 | 2.0 | 3.0 |
| Soft., ° C | 642 | 646 | 618 | 621 | 635 |
| Ann., ° C | 452 | 458 | 436 | 440 | 444 |
| Strain, ° C | 413 | 420 | 399 | 403 | 403 |
| Exp | 89.2 | 89.1 | 92.7 | 90.1 | 89.7 |

My preferred glass is Example 10, the batch ingredients of which are listed below in parts by weight:

| | |
|---|---|
| Pulverized sand | 501 |
| Litharge | 279 |
| Sodium carbonate | 49 |
| Sodium chloride | 20 |
| Potassium carbonate | 132 |
| Feldspar | 70 |
| Black iron oxide | 31 |

A glass from this batch was produced by melting for about 7 hours at 1,420° C. in a platinum crucible. The transmission of infrared radiations through this glass is illustrated by Curve No. 1 in the accompanying drawing. Curves Nos. 2, 3, and 4 record the infrared transmission of other glass compositions falling within the ambit of this invention. Curve No. 5 sets forth the infrared transmission of a glass which has been widely used commercially for sealing to "Dumet," No. 52 Alloy and No. 4 Alloy, viz., Corning Code 0120. This glass follows a curve which is typical of those transparent glasses which have been conventionally used for this purpose in the past. Thus, it has virtually no absorption in the usual thickness (about 1 mm.) at the lower end of the 0.7–4 micron wave length range. Near 3 microns it begins to exhibit absorption and this gradually increases, reaching around 50% at 4 microns and about 100% at 5 microns. The marked improvement in the absorption of infrared radiations possessed by the glasses of this invention in the range of 0.7–4 microns is readily apparent from a comparison of Curve 5 with Curves 1–4. This improvement provides the practical benefit of enabling the actual sealing operation to be conducted more rapidly. This speed of sealing has the further advantage in that a solid state device which is being encapsulated is not subjected to as much heat during the sealing procedure. Finally, the absorbance of the glass also acts to shield the interior from heat. This desire to protect the encapsulated device dictates the need for a soft glass, i.e., one which softens and is usable for sealing at relatively low temperatures. A further desirable feature in a sealing glass is resistance to acid attack since in some devices it is necessary to form a metal plating thereon, very often this plating being of gold or silver which is deposited from an alkali cyanide bath. Later the plated object may be subjected to an acid pickling bath to clean off the metal.

The glasses of this invention do possess these ancillary useful properties in addition to demonstrating substantially complete absorption of infrared radiations of a wave length of 1 micron. This absorption gradually decreases over the range to 4 microns but even here over 50% of the radiation is absorbed. Since in addition the coefficient of thermal expansion of these glasses closely approximates that of "Dumet," No. 52 Alloy, and No. 4 Alloy, they are eminently suitable as sealing glasses thereto. Finally, each of these glasses has a viscosity of at least 15,000 poises at its liquidus, thereby permitting the drawing of tubing therefrom on automatic machines and thus making possible the mass production of small lengths of tubing which are used for encapsulating semiconductor and other electronic devices.

I claim:

1. A transparent glass exhibiting good absorbance of infrared radiations generally within the range of wave lengths of 0.7–4.0 microns and having a linear coefficient of expansion between 0°–300° C. of about $$80\text{–}95\times 10^7/° \text{ C.}$$

consisting essentially by weight, as calculated from the batch on the oxide basis, of 7–15% $R_2O$, 20–50% PbO, 35–63% $SiO_2$, 2–6% $Fe_3O_4$, $R_2O$ referring to the alkali metal oxides, and essentially free of $As_2O_3$ and $Sb_2O_3$, the sum of these constituents totalling at least 95% by weight of the batch.

2. A transparent glass according to claim 1 consisting essentially by weight, as calculated from the batch on the oxide basis, of about 54% $SiO_2$, 30% PbO, 3% $Na_2O$, 9% $K_2O$, 1% $Al_2O_3$, and 3% $Fe_3O_4$.

3. A method for producing an infrared absorbing sealing glass comprising the steps of:

(1) preparing a batch of glass making material consisting essentially by weight, on the oxide basis, of 7–15% $R_2O$, 20–50% PbO, 35–63% $SiO_2$, 2–6% $Fe_3O_4$, $R_2O$ referring to the alkali metal oxides, and being essentially free from $As_2O_3$ and $Sb_2O_3$, the sum of the $R_2O$, $SiO_2$, PbO, and $Fe_3O_4$ totalling at least 95% by weight of the batch, and (2) melting said batch under controlled oxidation-reduction conditions such that the resulting glass is free from metallic lead and a substantial amount of the oxide of iron present therein is ferrous oxide.

References Cited

UNITED STATES PATENTS 3,326,702 6/1967 Babcock ............ 106—52

HELEN M. McCARTHY, *Primary Examiner.*

W. R. SATTERFIELD, *Assistant Examiner.*

U.S. Cl. X.R.

29—588; 65—134; 350—1